US011809438B2

(12) United States Patent
Tang et al.

(10) Patent No.: US 11,809,438 B2
(45) Date of Patent: Nov. 7, 2023

(54) METHOD AND DEVICE OF DETECTING FAULT IN PRODUCTION

(71) Applicant: BOE Technology Group Co., Ltd., Beijing (CN)

(72) Inventors: Yue Tang, Beijing (CN); Hong Wang, Beijing (CN); Dong Chai, Beijing (CN); Haohan Wu, Beijing (CN); Xuefeng Kan, Beijing (CN); Tian Lan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 358 days.

(21) Appl. No.: 17/297,723

(22) PCT Filed: Sep. 22, 2020

(86) PCT No.: PCT/CN2020/116773
§ 371 (c)(1),
(2) Date: May 27, 2021

(87) PCT Pub. No.: WO2021/057707
PCT Pub. Date: Apr. 1, 2021

(65) Prior Publication Data
US 2022/0043812 A1 Feb. 10, 2022

(30) Foreign Application Priority Data
Sep. 29, 2019 (CN) .......................... 201910939830.3

(51) Int. Cl.
*G06F 16/2458* (2019.01)
*G05B 19/418* (2006.01)

(52) U.S. Cl.
CPC ... *G06F 16/2465* (2019.01); *G05B 19/41875* (2013.01); *G05B 2219/32368* (2013.01)

(58) Field of Classification Search
CPC .......... G06F 16/2465; G05B 19/41875; G05B 2219/32368
See application file for complete search history.

(56) References Cited

U.S. PATENT DOCUMENTS

| 9,020,625 | B2 * | 4/2015 | Elmore | ................. | G06Q 10/06 |
| | | | | | 700/36 |
| 2015/0142154 | A1 * | 5/2015 | Tiano | ................. | G05B 19/4065 |
| | | | | | 700/109 |
| 2021/0312516 | A1 * | 10/2021 | McLaughlin | ...... | G06Q 30/0621 |

FOREIGN PATENT DOCUMENTS

| CN | 104407589 A | 3/2015 |
| CN | 105940354 A | 9/2016 |
| CN | 110083797 A | 8/2019 |

(Continued)

*Primary Examiner* — Apu M Mofiz
*Assistant Examiner* — Husam Turki Samara
(74) *Attorney, Agent, or Firm* — WHDA, LLP (57) ABSTRACT

According to the embodiments of the present disclosure, there is provided a method and device of detecting fault in production, and a computer readable storage medium. The method includes: determining whether a plurality of production paths in a production line are faultless in one or more production batches, based on production record data; and determining at least one of the plurality of production paths to be faulty, at least partially based on whether the plurality of production paths are faultless in the one or more production batches.

14 Claims, 6 Drawing Sheets

(56) References Cited

FOREIGN PATENT DOCUMENTS

DE    20 2017 005 070 U1    11/2017
EP             3106948 A1    12/2016

* cited by examiner

FIG. 6

METHOD AND DEVICE OF DETECTING FAULT IN PRODUCTION

CROSS-REFERENCE TO RELATED APPLICATION

This application is a Section 371 National Stage Application of International Application No. PCT/CN2020/116773, filed on Sep. 22, 2020, entitled "METHOD AND DEVICE OF DETECTING FAULT IN PRODUCTION", which claims priority to Chinese Patent Application No. 201910939830.3, filed on Sep. 29, 2019, entitled "METHOD AND DEVICE OF DETECTING FAULT IN PRODUCTION", which are incorporated herein by reference in their entirety.

TECHNICAL FIELD

The present disclosure generally relates to a field of data mining, and more specifically, relates to a method and device of detecting fault in production.

BACKGROUND

In recent years, with a rapid development of machine learning and computer software and hardware, a computer intelligence learning technology has been widely used in various fields of manufacturing, such as device checking.

In a production process of products such as liquid crystal panels, various product defects are inevitable. There are many factors leading to the product defects, which may involve various links and nodes in a production line. Therefore, a method is needed to accurately, quickly and efficiently determine a working path and even a working node in the production line that causes the products to be defective.

SUMMARY

According to a first aspect of the present disclosure, a method of detecting fault in production is provided. The method includes: obtaining, by the processor, production record data related to a plurality of nodes in a production line; determining, by the processor, whether a plurality of production paths in the production line are faultless in one or more production batches, based on the production record data; determining, by the processor, at least one of the plurality of production paths to be faulty, at least partially based on whether the plurality of production paths are faultless in the one or more production batches; and outputting, by the processor, information related to the at least one production path determined to be faulty.

In some embodiments, the determining, by the processor, at least one of the plurality of production paths to be faulty, at least partially based on whether the plurality of production paths are faultless in the one or more production batches includes: determining, by the processor, influence scores of the plurality of production paths regarding to whether products produced by the plurality of production paths are faultless, based on whether the plurality of production paths are faultless in the one or more production batches; and determining, by the processor, at least one of the plurality of production paths to be faulty, at least partially based on the influence scores of the plurality of production paths.

In some embodiments, the determining, by the processor, whether a plurality of production paths in the production line are faultless in one or more production batches, based on the production record data includes: calculating, by the processor, a product defective rate of each of the plurality of production paths in each of the one or more production batches, based on the production record data; and determining, by the processor, whether each production path is faultless in each production batch, based on product defective rates of the plurality of production paths in the one or more production batches and a threshold interval for the product defective rates.

In some embodiments, the determining, by the processor, whether each production path is faultless in each production batch, based on the product defective rates of the plurality of production paths in the one or more production batches and a threshold interval for the product defective rates includes: calculating, by the processor, a mean $\mu$ of the product defective rates of the plurality of production paths in the one or more production batches and a standard deviation $\sigma$ of the product defective rates of the plurality of production paths in the one or more production batches; and for each production path in each production batch, determining, by the processor, that a production path is faulty in a production batch, in response to a product defective rate of the production path in the production batch being outside a threshold interval $(\mu-3\sigma, \mu+3\sigma)$, and determining, by the processor, that the production path is faultless in the production batch, in response to the product defective rate of the production path in the production batch being inside the threshold interval $(\mu-3\sigma, \mu+3\sigma)$.

In some embodiments, the determining, by the processor, influence scores of the plurality of production paths regarding to whether products produced by the plurality of production paths are faultless, based on whether the plurality of production paths are faultless in the one or more production batches includes: for each production path, determining, by the processor, an influence score according to one of or any combination of: a support; a confidence; a lift; and a harmonic mean of the lift and a number of production batches in which said each production path is determined to be faultless or faulty.

In some embodiments, for each production path determined to be faultless, the harmonic mean determined as the influence score is calculated, by the processor, according to:

$$F_1 = \frac{2}{\frac{1}{lift_1} + \frac{1}{count_1}},$$

wherein $F_1$ represents an influence score of the faultless production path regarding to products produced by the production path being faultless, $lift_1$ represents a lift of the faultless production path regarding to products produced by the production path being faultless, and $count_1$ represents a number of production batches in which the faultless production path is determined to be faultless.

In some embodiments, for each production path determined to be faulty, the harmonic mean determined as the influence score is calculated, by the processor, according to:

$$F_2 = \frac{2}{\frac{1}{lift_2} + \frac{1}{count_2}},$$

wherein $F_2$ represents an influence score of the faulty production path regarding to products produced by the production path being faulty, $lift_2$ represents a lift of the faulty production path regarding to products produced by the production path being faulty, and $count_2$ represents a number of production batches in which the faulty production path is determined to be faulty.

In some embodiments, the lift is calculated according to:

$$lift_i = \frac{\frac{n}{m}}{\frac{N}{M}}, i = 1 \text{ or } 2,$$

wherein n represents a number of production batches in which a production path is determined to be faultless or faulty, m represents a number of production batches using the production path determined to be faultless or faulty, N represents a total number of production batches in which production paths are determined to be faultless or faulty, and M represents a total number of production batches for all production paths.

In some embodiments, the support $support_i$ and the confidence $confidence_i$ are calculated according to:

$$support_i = \frac{n}{M}, i = 1 \text{ or } 2,$$

$$confidence_i = \frac{n}{m}, \quad i = 1 \text{ or } 2.$$

In some embodiments, the determining, by the processor, at least one of the plurality of production paths to be faulty, at least partially based on the influence scores of the plurality of production paths includes: ranking, by the processor, the influence scores of the plurality of production paths; and determining, by the processor, a first number of production paths having influence scores ranked in front among the plurality of production paths to be faulty.

In some embodiments, the determining, by the processor, at least one of the plurality of production paths to be faulty, at least partially based on the influence scores of the plurality of production paths includes: ranking, by the processor, the influence scores of the plurality of production paths; performing, by the processor, an association rule analysis on nodes contained in a first number of production paths having influence scores ranked in front among the plurality of production paths, in order to determine a frequent set of the nodes; and determining, by the processor, one or more node combinations in the frequent set to be faulty.

In some embodiments, the determining, by the processor, one or more node combinations in the frequent set to be faulty includes: for each node combination in the frequent set, determining, by the processor, influence scores of said each node combination regarding to whether products produced by the plurality of production paths are faultless, based on whether said each node combination is faultless in the one or more production batches; and determining, by the processor, one or more node combinations in the frequent set to be faulty, at least partially based on the influence scores of said each node combination in the frequent set.

In some embodiments, the method further includes: calculating, by the processor, a weight of evidence of each node, based on whether the plurality of production paths are faultless in the one or more production batches; and determining, by the processor, a second number of nodes having weights of evidence ranked in front to be faulty nodes.

In some embodiments, the calculating, by the processor, a weight of evidence of each node, based on whether the plurality of production paths are faultless in the one or more production batches includes: for each node, determining, by the processor, the weight of evidence of said each node by: dividing the plurality of production paths into a group of production paths containing said each node and a group of production paths not containing said each node; calculating a weight of evidence of said each node in each group according to:

$$WOE_i = \ln\left(\frac{\frac{G_i}{G_{total}}}{\frac{B_i}{B_{total}}}\right) i = 1 \text{ or } 2,$$

wherein $WOE_i$ represents a weight of evidence of a corresponding node in a group of production paths containing the corresponding node and a weight of evidence of the corresponding node in a group of production paths not containing the corresponding node, $\ln(\cdot)$ represents a natural logarithmic function, $G_i$ represents a number of faulty production batches of a corresponding group of production paths, $G_{total}$ represents a total number of faulty production batches, $B_i$ represents a number of faultless production batches of the corresponding group of production paths, and $B_{total}$ represents a total number of faultless production batches.

In some embodiments, the method further includes: calculating, by the processor, a weight of evidence of each node based on whether the plurality of production paths are faultless in the one or more production batches; calculating, by the processor, an information value of said each node based on the weight of evidence according to:

$$IV = \sum_i IV_i, \text{ and } IV_i = \left(\frac{G_i}{G_{total}} - \frac{B_i}{B_{total}}\right) \times WOE_i,$$

wherein IV represents the information value of said each node, and $IV_i$ is an information value of said each node in a corresponding group; and determining, by the processor, a third number of nodes having information values ranked in front to be faulty nodes.

According to a second aspect of the present disclosure, a device of detecting fault in production is provided. The device includes: a processor; and a memory, having instructions stored thereon, wherein the instructions, when executed by the processor, cause the processor to implement the method of the first aspect as described above.

According to a third aspect of the present disclosure, there is provided a computer-readable storage medium storing instructions that, when executed by a processor, cause the processor to implement the method of the first aspect of the present disclosure.

BRIEF DESCRIPTION OF THE DRAWINGS

The above and other features of the present disclosure will become more apparent through the following detailed description in conjunction with the drawings, in which.

DETAILED DESCRIPTION OF EMBODIMENTS

Some embodiments of the present disclosure will be further described in detail below in connection with the drawings. Details and functions that are unnecessary for the present disclosure are omitted in the description to avoid confusion about the understanding of the present disclosure. In the description, the following embodiments for describing the principle of the present disclosure are for illustration only and should not be explained as limiting the scope of the present disclosure in any way. The following description with reference to the drawings is used for a comprehensive understanding of exemplary embodiments of the present disclosure defined by the claims and their equivalents. In the following description, various specific details are set forth in order to help understanding. However, these specific details should be considered only exemplary. Therefore, those of ordinary skill in the art should understand that various changes and modifications may be made to the embodiments described herein without departing from the scope and spirit of the present disclosure. In addition, for clarity and brevity, descriptions of well-known functions and structures are omitted. Moreover, throughout the drawings, the same reference numerals are used for the same or similar functions, devices, and/or operations. Furthermore, in the drawings, various parts are not necessarily drawn to scale. In other words, the relative sizes, lengths, etc. of each part in the drawings do not necessarily correspond to an actual ratio. Additionally, all or part of the features described in some embodiments of the present disclosure may further be applied to other embodiments to get new embodiments that still fall within the scope of the present application.

The present disclosure does not limited a specific operating system of the device, and the system may include (but is not limited to) Windows, Linux, MacOS, UNIX, Solaris, iOS, Windows Phone, Symbian, Android, etc. Different devices may use same operating systems or different operating systems.

Although a production line for liquid crystal displays is used as a specific scene below to describe the solution of detecting fault in a production line according to the embodiments of the present disclosure, the present disclosure is not limited to this. In fact, with proper adjustments and modifications, the embodiments of the present disclosure may further be applied to some other situations where nodes/paths having faulty modes or other modes need to be detected. For example, the embodiments of the present disclosure may be used to detect efficient nodes leading to ultra-low product defective rates, etc. In other words, the solution according to the embodiments of the present disclosure may be applied to a scenario as long as a difference of influences between various nodes in a certain aspect needs to be determined.

In addition, more generally, some embodiments of the present disclosure are further applicable to scenarios where faults in other workflows are determined. For example, in a shopping guide page of an e-commerce website, different shopping guide workflows (for example, different checkout pages, shopping pages, recommendation pages, recommendation orders, checkout orders, etc.) may cause the same consumer to make different purchase decisions ultimately. The different shopping guide workflows may even cause the consumers to give up the purchase. In this case, the solution of detecting fault according to the embodiments of the present disclosure may be used to help determine a path/node affecting product sales in the shopping guide workflows.

Figure 1:
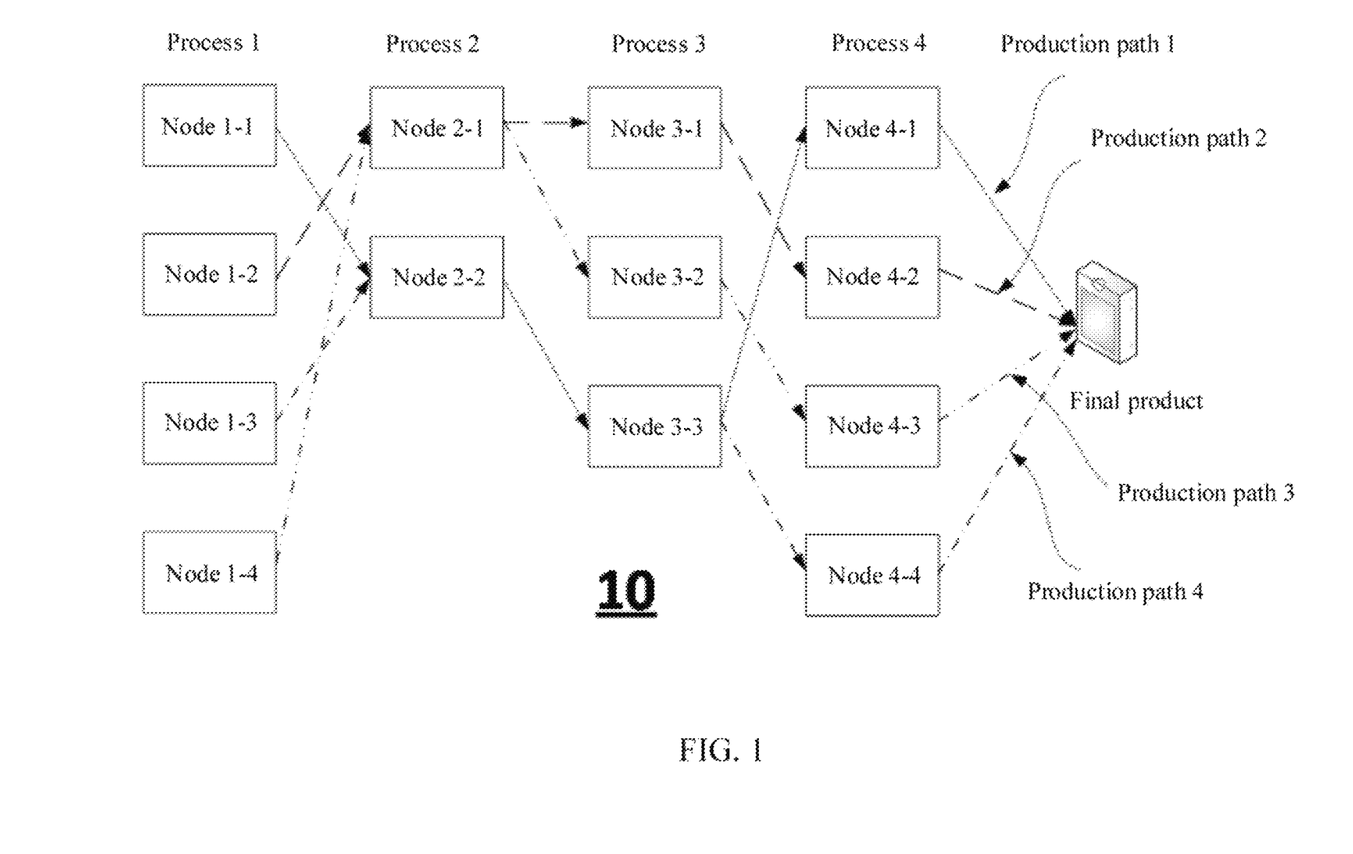
FIG. 1 schematically shows a diagram of a production line to which a method of detecting fault in production according to the embodiments of the present disclosure may be applied.

First, an exemplary scenario where the method of some embodiments of the present disclosure may be applied will be described in detail with reference to FIG. 1. FIG. 1 schematically shows a diagram of a production line 10 to which a method of detecting fault in production according to the embodiments of the present disclosure may be applied.

As shown in FIG. 1, the production line 10 may include a plurality of processes, and each process may include nodes providing same services or producing same intermediate products. In the embodiments shown in FIG. 1, the production line 10 may include process 1, process 2, process 3, and process 4. The same process may be implemented by one of different nodes to achieve a large-scale standardized production in parallel. For example, as shown in FIG. 1, process 1 may be implemented by four nodes (i.e., nodes 1-1 to 1-4) respectively, process 2 may be implemented by two nodes (i.e., nodes 2-1 to 2-2) respectively, process 3 may be implemented by three nodes (i.e., nodes 3-1 to 3-3) respectively, and process 4 may be implemented by four nodes (i.e., nodes 4-1 to 4-4) respectively. However, it should be noted that the number of processes and the number of nodes in each process are not limited to the embodiments shown in FIG. 1, but may be set as needed in actual productions.

For example, if the production line 10 is a production line for liquid crystal panels, then process 1 may be a process for preparing source and drain photoresist patterns in array substrates, process 2 may be a process for preparing pixel electrode photoresist patterns, process 3 may be a process for forming pixel electrode patterns by etching, and process may be a process for preparing passivation layer patterns. Each node may be a device for completing a corresponding process, such as a lithography machine, a vacuum evaporator, a spinner, etc. However, it should be noted that these processes are only for example, and the present disclosure is not limited thereto. There may be more, fewer or other different processes in an actual production line.

Generally, intermediate products after completing the same process may be received and processed by any node of a subsequent process. For example, as shown in FIG. 1, products processed by node 2-1 may be distributed to one of nodes 3-1 and 3-2 of process 3 to be produced in parallel, thereby improving a production efficiency. Thus, a plurality of production paths (such as production paths 1 to 4 shown in FIG. 1) may be formed in the production line 10.

As shown in FIG. 1, production path 1 may include node 1-1 of process 1, node 2-2 of process 2, node 3-3 of process 3, and node 4-1 of process 4. Production path 2 may include node 1-2 of process 1, node 2-1 of process 2, node 3-1 of process 3, and node 4-2 of process 4. Production path 3 may include node 1-3 of process 1, node 2-2 of process 2, node 3-3 of process 3, and node 4-4 of process 4. Production path 4 may include node 1-4 of process 1, node 2-1 of process 2, node 3-2 of process 3, and node 4-3 of process 4. As shown in FIG. 1, there may be some same nodes between production paths 1 to 4. For example, production path 1 and production path 4 share nodes 2-2 and 3-3, and production path 2 and production path 3 share node 2-1. In addition, although not shown in FIG. 1, in other embodiments, some production paths may further skip a certain process. For example, a certain production path may include node 1-1 of process 1, node 3-3 of process 3, and node 4-1 of process 4, without any node of process 2. That is, an intermediate product from node 1-1 may be transmitted to node 3-3 directly without going through process 2. Moreover, in other embodiments, for example, in some embodiments involving e-commerce, different production paths may include exactly the same nodes, and an only difference is between arrangement orders for the nodes.

As shown in FIG. 1, after all the process have been performed, final products, such as liquid crystal panels, may be produced. However, it should be noted that yields or defective rates of the final products may be different for each production path, due to differences between nodes and/or paths (for example, brands, types, technologies, service lives, operators, etc.). For example, products produced by production path 1 may have a higher yield, while products produced by production path 2 may have a lower yield. Therefore, a method is needed to identify a production path and even a node in the production line that tend to cause product defects, in order to improve the production efficiency and reduce production costs. Thus, production tasks for the production path or the node may be reduced, and corresponding repairs and improvements or other disposals may further be performed. On the other hand, a method is further needed to identify a production path and a node in the production line that tend to cause higher product yields, so that production tasks may be allocated to the production path and the node as many as possible.

In addition, as mentioned above, if the operators are taking into consideration, then a combination of the same device with different operators may further be regarded as different nodes. In this way, it is possible to further identify a device/operator combination that may improve productivity. For example, a combination of a device in process 1 shown in FIG. 1 with an operator may be regarded as node 1-1, and a combination of the device with another operator may be regarded as node 1-2, etc.

In addition, there may be a plurality of production batches in the actual productions. Therefore, in some embodiments, the same production path may have different yields in different production batches, due to different raw materials, times and other factors. Thus, the production batches are further considered as one of the factors below.

In addition, although only four production paths are shown in FIG. 1, the present disclosure is not limited thereto. In fact, in actual productions, for example, in the production line for liquid crystal panels, there may be hundreds of processes involved, and each process may include tens, hundreds, or even thousands of nodes (for example, devices and/or operators, etc.). Therefore, a solution is needed to find and identify a production path and/or a node that may have the greatest influence on the product yield or the defective rate from the massive amount of data. Hereinafter, the solution will be described in detail with reference to FIGS. 2 to 5.

Figure 2:
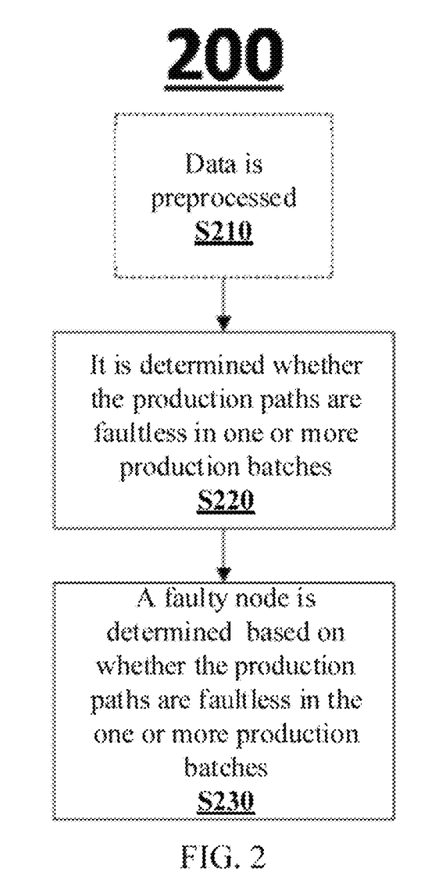
FIG. 2 schematically shows a flowchart of a method of determining fault in a production line according to the embodiments of the present disclosure.

FIG. 2 schematically shows a flowchart of a method 200 of determining fault in a production line according to the embodiments of the present disclosure.

In some embodiments, production record data related to a plurality of nodes in the production line may be obtained before the method 200 is implemented. For example, in some embodiments, the production record data may be received from the plurality of nodes in the production line. For example, in the embodiments described below, the plurality of nodes may be a plurality of nodes of a plurality of processes in a production line for producing liquid crystal panels, such as nodes 1-1 to 4-4 shown in FIG. 1. However, the present disclosure is not limited to this. For example, the production record data may further be obtained from a unified data production log.

As shown in FIG. 2, the method 200 may start at an optional step S210. At step S210, the production record data may be preprocessed first to facilitate subsequent operations such as data analysis and data mining.

For example, in the field of liquid crystal panel production, vertical black and white lines are a product defect that often occurs in productions of liquid crystal panels. However, the present disclosure is not limited to this. In fact, the product defects may include (but are not limited to): alight leak, black screens, dead pixels, hot pixels, black spots, white spots, screen shake, color faults, liquid crystal leakage, liquid crystal bubbles, other physical damages, no backlight, or any other defects affecting the use of the product. In other embodiments such as the e-commerce, the defects may include (but are not limited to): trading halts, sales returns, payment failures, or any defects affecting product or service sales.

In case of the vertical black and white lines being an example of the defect, data of some node devices in an array substrate production phase and a cell process phase may be selected, as shown in Table 1 and Table 2 below.

TABLE 1

| | Array substrate production phase | | | | | |
|---|---|---|---|---|---|---|
| Batch ID | Preparing source and drain photoresist layer | Preparing pixel electrode photoresist layer | Forming pixel electrode by etching | Number of modules input | Number of defective modules | Defective rate |
| L1 | Z2 | U1 | Y1 | 100 | 0 | 0.0% |
| L2 | Z1 | U1 | Y2 | 130 | 1 | 0.8% |
| L3 | Z1 | U1 | Y3 | 102 | 0 | 0.0% |
| L4 | Z1 | U1 | Y4 | 150 | 3 | 2.0% |
| L5 | Z2 | U1 | Y1 | 117 | 1 | 0.9% |
| L6 | Z2 | U1 | Y1 | 143 | 2 | 1.4% |
| L7 | Z2 | U1 | Y1 | 170 | 4 | 2.4% |
| L8 | Z1 | U1 | Y4 | 129 | 0 | 0.0% |
| L9 | Z1 | U1 | Y2 | 161 | 3 | 1.9% |

TABLE 2

| Cell process phase | |
| --- | --- |
| Glass substrate ID | Preparing passivation layer patterns |
| G1 | V1 |
| G2 | V1 |
| G3 | V1 |
| G4 | V1 |
| G5 | V1 |
| G6 | V1 |
| G7 | V1 |

In addition, since there may be reworks in the production, there may be a plurality of records corresponding to the same batch ID or the same glass substrate ID in the production record data above. In some embodiments, old history data may be deleted, such that only the last latest production record data is retained.

In addition, the data is recorded according to the batch ID and the glass substrate ID in two different production phases. Therefore, the record data of the cell process phase may be truncated (for example, record data corresponding to corresponding glass substrate IDs may be divided into record data of corresponding batch IDs separately) to obtain information based on the batches. The information based on the batches may be strung with the data of the array substrate production phase, so as to obtain Table 3 as follows.

TABLE 3

| | Integrated production record data | | | | | | |
| --- | --- | --- | --- | --- | --- | --- | --- |
| Batch ID | Preparing source and drain photoresist layer | Preparing pixel electrode photoresist layer | Forming pixel electrode by etching | Preparing passivation layer patterns | Number of modules input | Number of defective modules | Defective rate |
| L1 | Z2 | U1 | Y1 | V1 | 100 | 0 | 0.0% |
| L2 | Z1 | U1 | Y2 | V1 | 130 | 1 | 0.8% |
| L3 | Z1 | U1 | Y3 | V1 | 102 | 0 | 0.0% |
| L4 | Z1 | U1 | Y4 | V1 | 150 | 3 | 2.0% |
| L5 | Z2 | U1 | Y1 | V1 | 117 | 1 | 0.9% |
| L6 | Z2 | U1 | Y1 | V1 | 143 | 2 | 1.4% |
| L7 | Z2 | U1 | Y1 | V1 | 170 | 4 | 2.4% |
| L8 | Z1 | U1 | Y4 | V2 | 129 | 0 | 0.0% |
| L9 | Z1 | U1 | Y2 | V2 | 161 | 3 | 1.9% |

However, it should be noted that the present disclosure is not limited to the various data in the table above, and there may be more, less, or other types of data. For example, the defective rate may be replaced by a yield. Alternatively, in the e-commerce scenario, the defective rate may be replaced by a transaction rate, a transaction amount, etc. In addition, it should further be noted that the step S210 may be optional. Therefore, if the production record data may be used directly, then step S210 may be skipped.

In the present disclosure, the term "production record data" may refer to various data related to production lines, production paths, production devices, production personnel, production raw materials, or production products, including (but not limited to): charge gauges, device logs, production logs, production plans, product statistics, sales data, etc.

Referring to FIG. 2, after the optional step S210 for data preprocessing is performed, step S220 may be performed. In step S220, it may be determined whether the plurality of production paths in the production line are faultless in one or more production batches, based on the (preprocessed) production record data.

For example, in the embodiments of the table above, for a production path Z2-U1-Y1-V1 corresponding to a batch L1, it may be determined whether the production path Z2-U1-Y1-V1 corresponding to the batch L1 is faultless in terms of production. In some embodiments, a defective rate of the production path Z2-U1-Y1-V1 in the batch L1 may be compared with a predetermined threshold simply, so as to determine whether the production path Z2-U1-Y1-V1 in the batch L1 is faultless. If the defective rate is greater than or equal to the predetermined threshold (such as (but not limited to) 2.0%), it is considered that the production path Z2-U1-Y1-V1 in the batch L1 is faulty. If the defective rate is smaller than the predetermined threshold, it is considered that the production path Z2-U1-Y1-V1 in the batch L1 is faultless. If the threshold is 2.0%, then the production path Z2-U1-Y1-V1 having a defective rate 0.0% is faultless in the production of batch L1. In contrast, the same production path Z2-U1-Y1-V1 having a defective rate 2.4% is faulty in a production of batch L7.

In addition, more complex and detailed methods may further be used to determine whether a certain production path is faultless. For example, an implementation of step S220 may be described in detail below in conjunction with the embodiments shown in FIG. 3.

Figure 3:
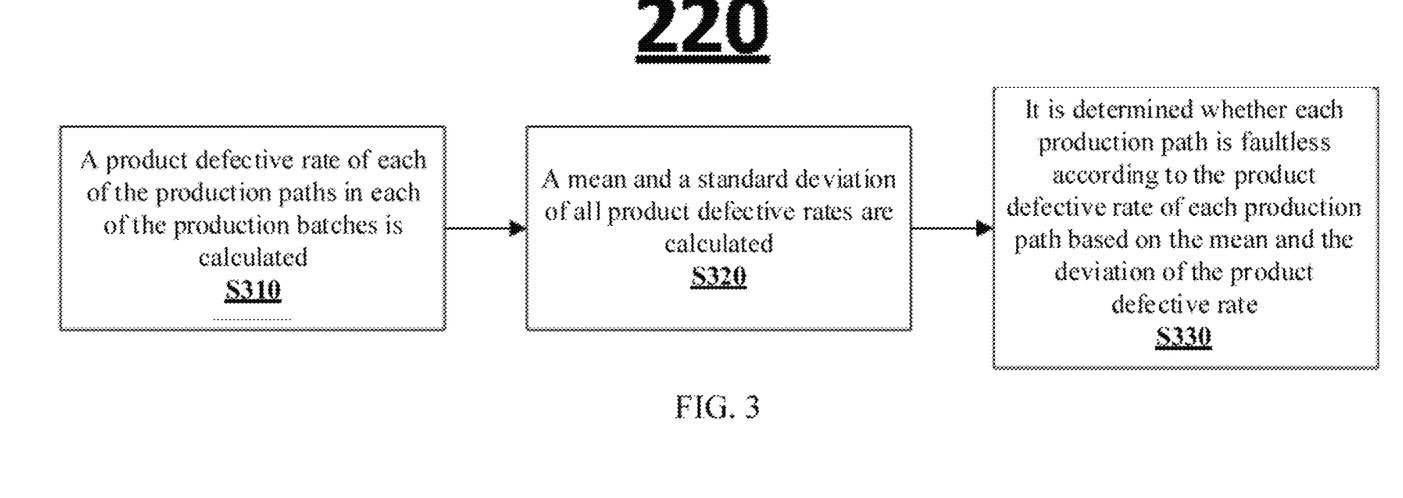
FIG. 3 schematically shows a flowchart of an implementation of one step shown in FIG. 2.

FIG. 3 schematically shows a flowchart of an implementation of step S220 shown in FIG. 2. As shown in FIG. 3, step S220 may include three sub-steps S310, S320, and S330. In step S310, a product defective rate of each of the plurality of production paths in each of the one or more production batches is calculated, based on the production record data. For example, as shown in Table 3 above, it is possible to calculate a product defective rate of each production path in corresponding batches. Then, in step S320, a mean $\mu$ of the product defective rates of the plurality of production paths in the one or more production batches and a standard deviation $\sigma$ of the product defective rates of the plurality of production paths in the one or more production batches are calculated. Next, in step S330, for each production path in each production batch, if a product defective rate of a production path in a production batch is outside a threshold interval ($\mu-3\sigma$, $\mu+3\sigma$), then it is determined that the production path is faulty in the production batch; and if the product defective rate of the production path in the production batch is inside the threshold interval ($\mu-3\sigma$, $\mu+3\sigma$), then it is determined that the production path is faultless in the production batch. In other words, in step S320 and step S330, it is possible to determine whether each production path is faultless in each production batch based on the product defective rates of the plurality of production paths in one or more production batches.

According to statistical principles, assuming that product qualities are in a Gaussian distribution, the interval ($\mu-3\sigma$, $\mu+3\sigma$) may cover about 99.7% of the defective rates. Any error outside this interval is usually not a random error, but a gross error. In addition, in other embodiments, an interval ($\mu-2\sigma$, $\mu+2\sigma$) or ($\mu-\sigma$, $\mu+\sigma$) may further be used as a determination interval. However, since these two intervals only cover 95.5% and 68.3% of the defective rates in the Gaussian distribution, there is a high probability of systematic errors in final results in statistics.

Referring to FIG. 3, the interval ($\mu-3\sigma$, $\mu+3\sigma$) may include almost all defective rates of faultless production paths. In other words, if there is a production path having a defective rate outside this range, then it may be determined basically that there is a problem in production (for example, a device failure, etc.). Specifically, in the embodiments shown in Table 3, the average value $\mu$ is about 1.04%, the standard deviation $\sigma$ is about 0.93%, such that the interval ($\mu-3\sigma$, $\mu+3\sigma$) is (−1.75%, 3.84%) approximately. In the embodiments, considering that the defective rate should not be a negative value, the interval may be regarded as [0, 3.84%). In other words, a production path having a defective rate falling within the interval [0, 3.84%) should be regarded as faultless in a corresponding batch, otherwise the production path is regarded as faulty. In this manner, all production paths in Table 3 may be regarded as faultless in all production batches. However, it should be noted that the data in Table 3 is for illustrative purposes only, and the present disclosure is not limited thereto.

Referring to FIG. 2, after it is determined whether each production path is faultless in respective production batches in step S220, step S230 may be performed. In step S230, at least one node in at least one of the plurality of production paths is determined as a faulty node, at least partially based on whether the plurality of production paths are faultless in the one or more production batches.

For example, in some embodiments, for each production path, a number of production batches, which are determined to be faulty, of the production path may be compared with a predetermined threshold. If the number is greater than the predetermined threshold, then the production path may be determined to be faulty. If the number is not greater than the predetermined threshold, then the production path may be determined to be faultless. In other embodiments, more complicated methods may further be used to determine the fault. For example, embodiments for implementing step S230 of determining a faulty production path may be described in detail below in conjunction with FIG. 4.

In some embodiments, after the method 200, information related to the at least one production path determined to be faulty may be output. For example, in some embodiments, the information related to the at least one production path determined to be faulty (such as serial numbers of nodes included in the path, a corresponding product yield/defective rate, etc.) may be output using a monitor, a printer, a speaker, etc. In addition, you may further output such information to, for example, production logs, databases, etc., for subsequent use.

Figure 4:
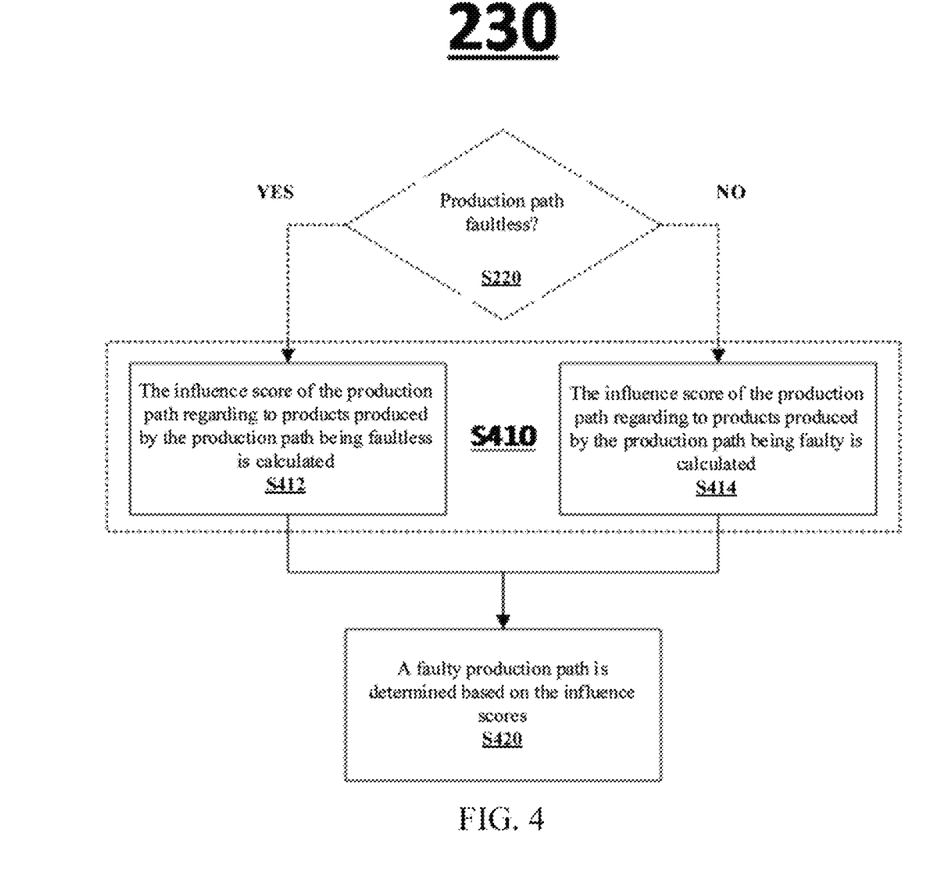
FIG. 4 schematically shows a flowchart of an implementation of another step shown in FIG. 2.

FIG. 4 schematically shows a flowchart of an implementation of step S230 shown in FIG. 2. As shown in FIG. 4, step S230 may include sub-steps S410 and S420.

In step S410, influence scores of the plurality of production paths regarding to whether products produced by the plurality of production paths are faultless are determined, based on whether the plurality of production paths are faultless in the one or more production batches.

In the present disclosure, the term "influence score" is used to indicate an influence of a production path regarding to whether products produced by the production path are qualified. Intuitively, if a defective rate of a production path is higher, then the production path has a greater influence regarding to products produced by the production path being unqualified. On the contrary, if the defective rate of the production path is lower, then the production path has a greater influence regarding to products produced by the production path being qualified. In addition, a global defective rate of all the production paths may be considered. For example, it is assumed that a specific production line is adopted. If the product defective rate of any production path is high, then the factor "production path" has a low influence on a change of the product defective rate. In contrast, if most of the production paths have a high product defective rate and only a specific production path has a low defective rate, then it may be intuitively considered that the specific production path has a substantial influence on the product defective rate (or yield).

In order to characterize these considerations, following concepts "support", "confidence" and "lift" are proposed. In some embodiments, an influence score of a production path may include any one of or any combination of a support, a confidence, a lift, a harmonic mean of the lift and a number of production batches in which the production path is determined to be faultless or faulty.

In the present disclosure, the term "support" may indicate a statistical probability of using a production path and determining that the production path is faultless (or faulty) in step S220 in all record data. For example, n represents a number of production batches in which a production path is determined to be faultless (or faulty), m represents a number of production batches using the production path determined to be faultless or faulty, N represents a total number of production batches in which production paths are determined to be faultless (or faulty), and M represents a total number of production batches for all production paths. The support of the production path may be calculated as follows.

$$support_i = \frac{n}{M}, \quad i = 1 \text{ or } 2 \qquad (1)$$

where $support_1$ may indicate a support of the production path regarding to products produced by the production path being faultless, and $support_2$ may indicate a support of the production path regarding to products produced by the production path being faulty. In other words, the support reflects a proportion of the production path being faultless (or faulty) in all record data. Therefore, if the proportion is too low, it may be considered that the production path has a relatively low influence on a final determination result. Therefore, in some embodiments, if a calculated support is lower than a certain threshold (for example, a support threshold 0.15 (not limited to this)), then it is possible not to consider an influence of the production path regarding to products produced by the production path being faultless (or faulty).

In addition, in the present disclosure, the term "confidence" may indicate a statistical probability of using an analyzed production path and determining that the analyzed production path is faultless (or faulty) in step S220 in record data related to the analyzed production path. The confidence of the production path may be calculated as follows.

$$confidence_i = \frac{n}{m}, \quad i = 1 \text{ or } 2 \qquad (2)$$

where $confidence_1$ may indicate a confidence of the production path regarding to products produced by the production path being faultless, and $confidence_2$ may indicate a confidence of the production path regarding to products produced by the production path being faulty. In other words, the confidence reflects how likely the products using the production path is faultless (or faulty). Similar to the support, in some embodiments, if a calculated confidence is lower than a certain threshold (for example, a confidence threshold 0.5 (not limited to this)), then it is possible not to consider an influence of the production path regarding to products produced by the production path being faultless (or faulty).

Figure 5:
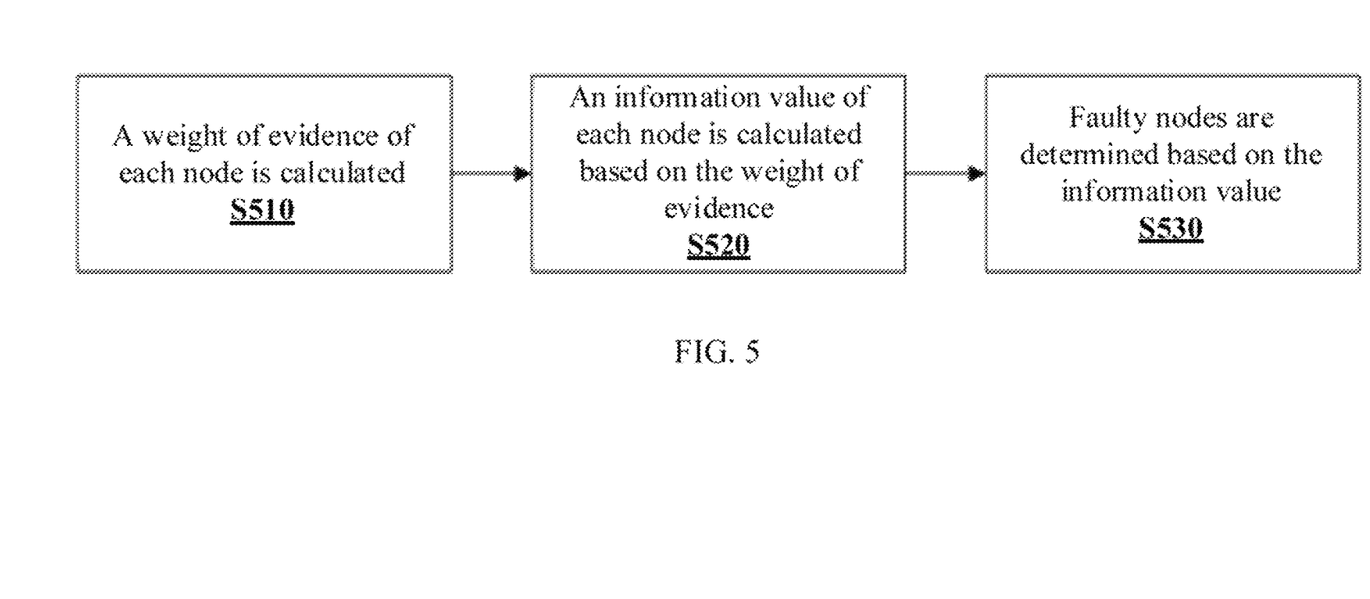
FIG. 5 schematically shows a flowchart of an implementation of another step shown in FIG. 2.

In some embodiments, at least one of the plurality of production paths may be determined to be faulty, based on influence scores of production paths having supports greater than or equal to the support threshold and/or having confidences greater than or equal to the confidence threshold. For example, in some embodiments, all production paths meeting the support threshold and the confidence threshold may be determined to be faulty. In other embodiments, some nodes in these production paths may further be determined as faulty nodes based on weights of evidence (WoE) and/or information values (IV) as shown in FIG. 5.

It should be noted that the use of the support threshold and the confidence threshold above is optional but not required. In some embodiments, the support threshold and the confidence threshold may be used to reduce a number of subsequent calculations, and are therefore not mandatory.

In addition, in the present disclosure, the term "lift" may indicate a lift, relative to all production paths, of the analyzed production path regarding to whether products produced by the production path are faultless (or faulty). Therefore, the lift of the analyzed production path may be calculated as follows.

$$lift_i = \frac{\frac{n}{m}}{\frac{N}{M}}, \quad i = 1 \text{ or } 2 \qquad (3)$$

where $lift_1$ may indicate a lift of the production path regarding to products produced by the production path being faultless, and $lift_2$ may indicate a lift of the production path regarding to products produced by the production path being faulty. In other words, the lift reflects a lift degree of products using the production path being faultless (or faulty) relative to products using other production paths.

Generally, if the lift is greater than 1, it may indicate that there is a lift of the production path regarding to products produced by the production path being faultless or faulty. If the lift is equal to 1, it may indicate that there is no lift and no drop of the production path regarding to products produced by the production path being faultless or faulty. If the lift is smaller than 1, it may indicate that there is a drop of the production path regarding to products produced by the production path being faultless or faulty. Therefore, if the lift is greater, then it may be considered that there is a visible effect of a corresponding production path regarding to products produced by the production path being faultless (or faulty), and the lift may be used as an influence score.

In addition, for the production path, an actual number of appearances of the production path in the record data should further be considered, in addition to reflecting an influence in the lift of the production path. In other words, in the record data of Table 3, for example, the path Z2-U1-Y1-V1 appears four times in Table 3. Therefore, an influence of the path Z2-U1-Y1-V1 should be increased correspondingly relative to other production paths. Thus, in some embodiments, the lift of the production path and the harmonic mean of the lift and the number of production batches in which the production path is determined to be faultless or faulty may be used to indicate the influence of the production path regarding to products produced by the production path being faultless or faulty.

For example, in the embodiments shown in FIG. 4, in step S412, for each production path determined to be faultless, the influence score (such as the harmonic mean) of the production path regarding to products produced by the production path being faultless may be determined according to a following formula.

$$F_1 = (1 + \beta^2) \frac{1}{\beta^2 \frac{1}{lift_1} + \frac{1}{count_1}} \qquad (4)$$

where $F_1$ represents the influence score of the faultless production path regarding to products produced by the production path being faultless, $lift_1$ represents a lift of the faultless production path regarding to products produced by the production path being faultless, $count_1$ represents a number of production batches in which the faultless production path is determined to be faultless, and $\beta$ represents a weight factor of $lift_1$ relative to $count_1$. In some embodiments, if $\beta=1$, the formula above may be simplified to a following formula.

$$F_1 = \frac{2}{\frac{1}{lift_1} + \frac{1}{count_1}} \qquad (5)$$

That is, in some embodiments, the influence score may be the harmonic mean of the lift and the number.

Similarly, in the embodiments shown in FIG. 4, in step S414, for each production path determined to be faulty, the influence score (such as the harmonic mean) of the production path regarding to products produced by the production path being faulty may be determined according to a following formula.

$$F_2 = (1 + \beta^2) \frac{1}{\beta^2 \frac{1}{lift_2} + \frac{1}{count_2}} \qquad (6)$$

where $F_2$ represents the influence score of the faulty production path regarding to products produced by the production path being faulty, $lift_2$ represents a lift of the faulty production path regarding to products produced by the production path being faulty, $count_2$ represents a number of production batches in which the faulty production path is determined to be faulty, and β represents a weight factor of lift₂ relative to count₂. In some embodiments, if β=1, the formula above may be simplified to a following formula.

$$F_2 = \frac{2}{\frac{1}{lift_2} + \frac{1}{count_2}} \quad (7)$$

That is, in some embodiments, the influence scores may further be the harmonic mean of the lift and the number.

As described above, in step S410 (step S412 and/or step S414), influence scores, of the production paths determined to be faultless or faulty, regarding to corresponding products being faultless or faulty may be calculated respectively, and the influence scores indicate the influences of the production paths on product qualities. In addition, in some other embodiments, for the production paths determined to be faultless, it is further possible to calculate influence scores regarding to products being faulty; or for the production paths determined to be faulty, it is possible to influence scores regarding to products being faultless.

Next, in step S420, at least one of the plurality of production paths is determined to be faulty, at least partially based on the influence scores of the plurality of production paths. For example, in some embodiments, the influence scores of the plurality of production paths may be ranked; and a first number of production paths ranked in the front in the plurality of production paths may be determined to be faulty. For example, production paths, having influence scores ranked in top three, top five, or top ten regarding to products produced by the production paths are defective, may all be determined as faulty (poor), and these production paths should be avoided in subsequent productions. In contrast, production paths, having influence scores ranked in top three, top five, or top ten (not limited to this) regarding to products produced by the production paths are quality, may all be determined as faultless (good), and these production paths should be used as much as possible in subsequent productions.

In addition, in other embodiments, the influence scores of the plurality of production paths may be ranked. An association rule analysis may be performed on nodes contained in a first number (for example, top three, top five, or top ten, but not limited to this) of production paths ranked in the front in the plurality of production paths, in order to determine a frequent set of the nodes. One or more node combinations in the frequent set may be determined to be faulty.

The association rule analysis may be used to determine the most frequent node combination in the record data. A simple example is used below to illustrate the association rule analysis. It is assumed that a plurality of items of the production paths determined to be faulty in the record data are: {1,2,3,4}, {1,2,4}, {1,2}, {2,3,4}, {2,3}, {3,4} and {2,4}. Each item represents nodes included in a production path. For example, {1,2,3,4} means that a production path includes nodes 1, 2, 3, and 4. The most common frequent item set or frequent set may be determined as follows.

First, a number of appearances of each node is counted separately. For example, for the record data above, the following results may be obtained.

| Node | Number of appearances |
|---|---|
| 1 | 3 |
| 2 | 6 |
| 3 | 4 |
| 4 | 5 |

For a certain node, it is assumed that a certain threshold (for example, 3) for the number of appearances should be met before proceeding to subsequent steps. In this case, the numbers of appearances of the nodes 1, 2, 3, and 4 all meet the threshold.

Next, a list for two-element pairs of all frequent items should be generated. For example, the list may be as follows.

| Two-element pair of the nodes | Number of appearances |
|---|---|
| {1, 2} | 3 |
| {1, 3} | 1 |
| {1, 4} | 2 |
| {2, 3} | 3 |
| {2, 4} | 4 |
| {3, 4} | 3 |

Similarly, for each two-element pair, it is determined whether the number of appearances meets the threshold. The two-element pairs {1,2}, {2,3}, {2,4} and {3,4} meet the threshold, but the two-element pairs {1,3} and {1,4} do not meet the threshold. Therefore, the two-element pairs {1,3} and {1,4} or all k-element pairs including the two-element pairs {1,3} and {1,4} are not processed subsequently.

Similarly, a list for three-element pairs of all frequent items is generated. For example, the list may be as follows.

| Three-element pair of the nodes | Number of appearances |
|---|---|
| {2, 3, 4} | 2 |

Since three-element pairs {1,2,3} and {1,2,4} respectively include {1,3} and {1,4} that were excluded in the previous operation, the three-element pairs {1,2,3} and {1,2,4} do not appear in the following list. In addition, the number of appearances of the three-element pair {2,3,4} is 2, which does not meet the threshold 3. Thus, there is no three-element pair of frequent items. Therefore, node combinations (k-element pairs) appeared frequently may be found from the record data using the association rule processing, and the node combinations may have an influence on whether the products produced by the node combinations are faultless or faulty. In some embodiments, all node combinations found may be regarded as faulty nodes. In other embodiments, the maximum node combination found (that is, an n-element pair of the nodes including the maximum number of nodes and meeting the threshold for the number of appearances) may be regarded as faulty.

In addition, in some embodiments, for one or more node combinations in the frequent item set, all or some of the node combinations may be determined to be faulty. In the embodiments in which some of the node combinations are determined to be faulty, a criterion for determining whether a node combination is faulty may include, for example, the support, the confidence, the lift, the harmonic mean, or any combination thereof. In addition, a definition for the support, the confidence, and the lift for the node combinations may be similar to the support, the confidence, and the lift for the production paths. That is, corresponding calculations are based on whether products pass the node combinations (rather than the production paths).

In addition, the method 200 shown in FIG. 2 may further include the steps as described below in conjunction with FIG. 5. In the steps in FIG. 5, a faulty node may be determined based on the weight of evidence and/or the information value. FIG. 5 schematically shows a flowchart of an implementation of another step shown in FIG. 2.

In the embodiments shown in FIG. 5, the method 200 may further include steps S510, S520, and S530. In step S510, for each node in the production line, each node in the production paths ranked in the front, or each node in the frequent set, a weight of evidence of the node may be calculated based on the production record data. In step S520, an information value of the node may be calculated based on the weight of evidence. In step S530, a third number (for example, top three, top five, top ten, or any other appropriate number) of nodes ranked in the front are determined as faulty nodes.

In addition, in other embodiments, the faulty nodes may further be determined directly based on the weight of evidence. For example, after step S510, a second number (for example, top three, top five, top ten, or any other appropriate number) of nodes ranked in the front are determined as the faulty nodes directly.

However, it should be noted that in step S510 of the embodiments above, the subsequent operations may be performed for each node in the production line, each node in the production paths ranked in the front, or each node in the frequent set, but the present disclosure is not limited to this. In fact, the operations may be performed on all or part of the nodes in all or part of the production paths, so as to obtain similar processing results.

In addition, in step S510, following operations may be performed for each node in any of the node sets above, for determining the weight of evidence. First, the plurality of production paths are divided into two groups. Said each node is contained in one of the two groups and is not contained in the other one of the two groups.

A weight of evidence of said each node in each group is calculated according to a following formula.

$$WOE_i = \ln\left(\frac{\frac{G_i}{G_{total}}}{\frac{B_i}{B_{total}}}\right) \quad i = 1 \text{ or } 2 \quad (8)$$

where $WOE_i$ represents a weight of evidence of a corresponding node in a group of production paths containing the corresponding node and a weight of evidence of the corresponding node in a group of production paths not containing the corresponding node, $\ln(\cdot)$ represents a natural logarithmic function, $G_i$ represents a number of faulty production batches of a corresponding group of production paths, $G_{total}$ represents a total number of faulty production batches, $B_i$ represents a number of faultless production batches of the corresponding group of production paths, and $B_{total}$ represents a total number of faultless production batches.

In addition, in step S520, the information value may be calculated according to a following formula.

$$IV = \sum_i IV_i, \quad i = 1 \text{ or } 2 \quad (9)$$

-continued $$IV_i = \left(\frac{G_i}{G_{total}} - \frac{B_i}{B_{total}}\right) \times WOE_i, \quad i = 1 \text{ or } 2 \quad (10)$$

where IV represents the information value of said each node, and $IV_i$ is an information value of said each node in a corresponding group.

The term "weight of evidence (WOE)" is used in statistics to represent a natural logarithm of a ratio of a probability of occurrence of a "non-event" to a probability of occurrence of an "event". The weight of evidence may be used to measure a distribution of these two events. The term "information value (IV)" is usually used in statistics to filter independent variables selected into a statistical model, so as to find a modeled variable. The information value may usually be used to represent an information amount that a variable may provide for the determination result. In other words, if a variable has a higher the information value, it is considered that the variable may provide more information for the final determination result, that is, the variable is more related to the final determination result. Specifically, in the embodiments of the present disclosure, the information value may be used to measure a contribution of a node regarding to whether a final product is faultless or faulty. Therefore, in the embodiments shown in FIG. 4, the information value is used to determine whether a node is more related to the fault of products.

In addition, in step S530, the information values of the nodes may be ranked, so that the second number (for example, top three, top five, top ten, or any other number) of nodes ranked in the front are determine as the faulty nodes. After the faulty nodes are determined, corresponding operations may be performed on the faulty nodes. For example, the faulty nodes may be excluded from a production dispatching, and may be adjusted, repaired, in order to improve product yields.

In this way, by using the method described in conjunction with FIGS. 2 to 5 of the present disclosure, it is possible to analyze a correlation between a product defect and production paths and production nodes (for example, production devices) when the product defect occurs. Production paths and production nodes leading to the defect may be located quickly and accurately, thereby reducing the defective rates and improving production efficiency and corporate benefits.

Figure 6:
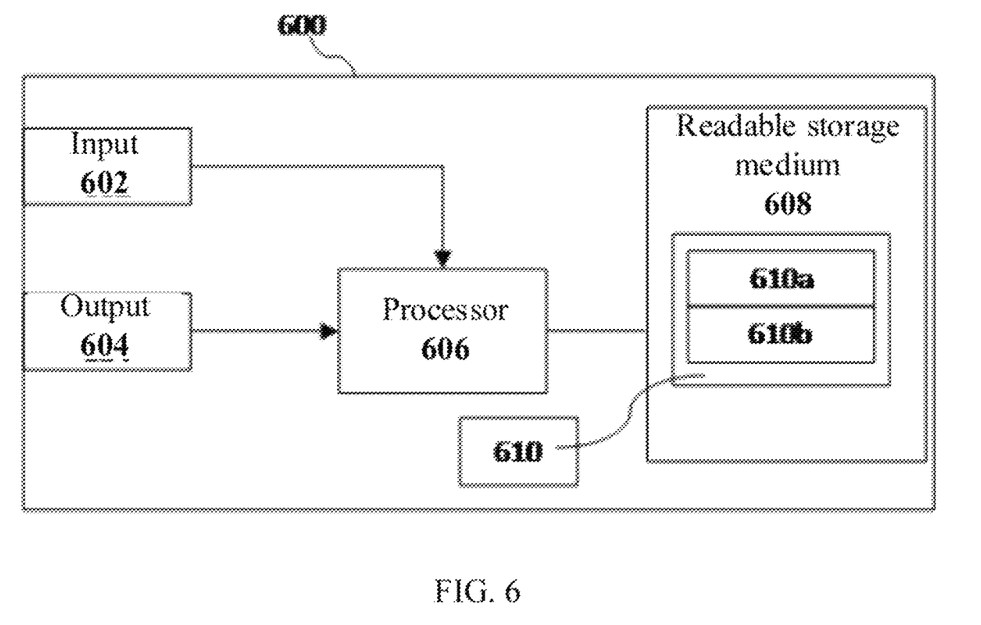
FIG. 6 schematically shows a hardware layout diagram of a device of detecting fault in production according to the embodiments of the present disclosure.

FIG. 6 schematically shows a hardware layout diagram of a device 600 of detecting fault in production according to the embodiments of the present disclosure. The hardware layout 600 includes a processor 606 (such as a digital signal processor (DSP)). The processor 606 may be a single processing unit or a plurality of processing units for executing different actions of the processes described herein. The layout 600 may further include an input unit 602 for receiving signals from other entities, and an output unit 604 for providing signals to other entities. The input unit 602 and the output unit 604 may be provided as a single entity or separate entities.

Furthermore, the layout 600 may include at least one readable storage medium 608 in a form of non-volatile memory or volatile memory. For example, the readable storage medium 608 may include an electrically erasable programmable read-only memory (EEPROM), a flash memory, and/or a hard disk drive. The readable storage medium 608 contains computer programs 610 including codes/computer readable instructions that, when executed by the processor 606 in the layout 600, cause the hardware layout 600 and/or a device including the hardware layout 600 to implement the flows described above in conjunction with FIGS. 2 to 5 and any variations thereof.

The computer programs 610 may be configured as computer program codes having a framework of computer program modules 610A to 610B. Therefore, the codes in the computer programs of the layout 600 include the module 610A. The module 610A is used to determine whether a plurality of production paths in the production line are faultless in one or more production batches, based on the production record data. The codes in the computer programs further include the module 610B. The module 610B is used to determine at least one of the plurality of production paths to be faulty, at least partially based on whether the plurality of production paths are faultless in the one or more production batches. In addition, the codes in the computer programs of the layout 600 may further include other modules, such as a module for obtaining production record data related to a plurality of nodes in a production line, and a module for outputting information related to the at least one production path determined to be faulty.

The computer program modules may implement each action in the processes shown in FIGS. 2 to 5 to simulate any hardware implementation. In other words, when different computer program modules are executed in the processor 606, the different computer program modules may correspond to different units in any hardware implementation.

The code manners in the embodiments disclosed above in conjunction with FIG. 6 is implemented as computer program modules that, when executed in the processor 606, cause the hardware layout 600 to implement the actions described above in conjunction with FIGS. 2 to 5. However, in other embodiments, at least one of the code manners may be at least partially implemented as a hardware circuit.

The processor may be a single CPU (central processing unit), but may further include two or more processing units. For example, the processor may include a general-purpose microprocessor, an instruction set processor, and/or a related chipset and/or a special-purpose microprocessor (for example, an application-specific integrated circuit (ASIC)). The processor may further include an on-board memory for caching purposes. The computer programs may be carried by a computer program product connected to the processor. The computer program product may include a computer readable medium storing computer programs thereon. For example, the computer program product may be a flash memory, a random access memory (RAM), a read-only memory (ROM), a EEPROM. In some embodiments the computer program modules above may be distributed to different computer program products in a form of memory in a device.

So far, the present disclosure has been described in conjunction with the optional embodiments. It should be understood that those skilled in the art may make various changes, substitutions and additions without departing from the spirit and scope of the present disclosure. Therefore, the scope of the present disclosure is not limited to the specific embodiments described above, but should be defined by the appended claims.

In addition, the functions described herein as being implemented by pure hardware, pure software and/or firmware may further be implemented by special-purpose hardware, and a combination of general-purpose hardware and software, etc. For example, functions described as being implemented by special-purpose hardware (such as a field programmable gate array (FPGA), application specific integrated circuit (ASIC), etc.) may be implemented by a combination of general-purpose hardware (such as central processing unit (CPU), digital signal processing, etc.) and software, and vice versa.

What is claimed is:

1. A method of detecting fault in production, the method is implemented by a processor, the method comprising:
   obtaining, by the processor, production record data related to a plurality of nodes in a production line;
   determining, by the processor, whether a plurality of production paths in the production line are faultless in one or more production batches, based on the production record data;
   determining, by the processor, at least one of the plurality of production paths to be faulty, at least partially based on whether the plurality of production paths are faultless in the one or more production batches; and
   outputting, by the processor, information related to the at least one production path determined to be faulty;
   wherein the determining, by the processor, at least one of the plurality of production paths to be faulty, at least partially based on whether the plurality of production paths are faultless in the one or more production batches comprises:
   determining, by the processor, influence scores of the plurality of production paths regarding to whether products produced by the plurality of production paths are faultless, based on whether the plurality of production paths are faultless in the one or more production batches; and
   determining, by the processor, at least one of the plurality of production paths to be faulty, at least partially based on the influence scores of the plurality of production paths; and
   wherein the determining, by the processor, influence scores of the plurality of production paths regarding to whether products produced by the plurality of production paths are faultless, based on whether the plurality of production paths are faultless in the one or more production batches comprises: for each production path, determining, by the processor, an influence score according to any combination of:
   a support;
   a confidence;
   a lift; and
   a harmonic mean of the lift and a number of production batches in which said each production path is determined to be faultless or faulty; and
   wherein, for each production path determined to be faultless, the harmonic mean determined as the influence score is calculated by the processor, according to:

$$F_1 = \frac{2}{\frac{1}{lift_1} + \frac{1}{count_1}},$$

wherein $F_1$ represents an influence score of the faultless production path regarding to products produced by the production path being faultless, $lift_1$ represents a lift of the faultless production path regarding to products produced by the production path being faultless, and $count_1$ represents a number of production batches in which the faultless production path is determined to be faultless.

2. The method of claim 1, wherein the determining, by the processor, whether a plurality of production paths in the production line are faultless in one or more production batches, based on the production record data comprises:
  calculating, by the processor, a product defective rate of each of the plurality of production paths in each of the one or more production batches, based on the production record data; and
  determining, by the processor, whether each production path is faultless in each production batch, based on product defective rates of the plurality of production paths in the one or more production batches and a threshold interval for the product defective rates.

3. The method of claim 2, wherein the determining, by the processor, whether each production path is faultless in each production batch, based on the product defective rates of the plurality of production paths in the one or more production batches and a threshold interval for the product defective rates comprises:
  calculating, by the processor, a mean μ of the product defective rates of the plurality of production paths in the one or more production batches and a standard deviation σ of the product defective rates of the plurality of production paths in the one or more production batches; and
  for each production path in each production batch,
    determining, by the processor, that a production path is faulty in a production batch, in response to a product defective rate of the production path in the production batch being outside a threshold interval (μ−3σ, μ+3σ), and
    determining, by the processor, that the production path is faultless in the production batch, in response to the product defective rate of the production path in the production batch being inside the threshold interval (μ−3σ, μ+3σ).

4. The method of claim 1, wherein for each production path determined to be faulty, the harmonic mean determined as the influence score is calculated by the processor, according to:

$$F_2 = \frac{2}{\frac{1}{lift_2} + \frac{1}{count_2}},$$

wherein $F_2$ represents an influence score of the faulty production path regarding to products produced by the production path being faulty, $lift_2$ represents a lift of the faulty production path regarding to products produced by the production path being faulty, and $count_2$ represents a number of production batches in which the faulty production path is determined to be faulty.

5. The method of claim 1, wherein the lift is calculated according to:

$$lift_i = \frac{\frac{n}{m}}{\frac{N}{M}}, \quad i = 1 \text{ or } 2,$$

wherein n represents a number of production batches in which a production path is determined to be faultless or faulty, m represents a number of production batches using the production path determined to be faultless or faulty, N represents a total number of production batches in which production paths are determined to be faultless or faulty, and M represents a total number of production batches for all production paths.

6. The method of claim 5, wherein the support $support_i$ and the confidence $confidence_i$ are calculated according to:

$$support_i = \frac{n}{M}, \quad i = 1 \text{ or } 2,$$
$$confidence_i = \frac{n}{m}, \quad i = 1 \text{ or } 2.$$

7. The method of claim 1, wherein the determining, by the processor, at least one of the plurality of production paths to be faulty, at least partially based on the influence scores of the plurality of production paths comprises:
  ranking, by the processor, the influence scores of the plurality of production paths; and
  determining, by the processor, a first number of production paths having influence scores ranked in front among the plurality of production paths to be faulty.

8. The method of claim 1, wherein the determining, by the processor, at least one of the plurality of production paths to be faulty, at least partially based on the influence scores of the plurality of production paths comprises:
  ranking, by the processor, the influence scores of the plurality of production paths;
  performing, by the processor, an association rule analysis on nodes contained in a first number of production paths having influence scores ranked in front among the plurality of production paths, in order to determine a frequent set of the nodes; and
  determining, by the processor, one or more node combinations in the frequent set to be faulty.

9. The method of claim 8, wherein the determining, by the processor, one or more node combinations in the frequent set to be faulty comprises:
  for each node combination in the frequent set, determining, by the processor, influence scores of said each node combination regarding to whether products produced by the plurality of production paths are faultless, based on whether said each node combination is faultless in the one or more production batches; and
  determining, by the processor, one or more node combinations in the frequent set to be faulty, at least partially based on the influence scores of said each node combination in the frequent set.

10. The method of claim 1, further comprising:
  calculating, by the processor, a weight of evidence of each node, based on whether the plurality of production paths are faultless in the one or more production batches; and
  determining, by the processor, a second number of nodes having weights of evidence ranked in front to be faulty nodes.

11. The method of claim 10, wherein the calculating, by the processor, a weight of evidence of each node, based on whether the plurality of production paths are faultless in the one or more production batches comprises:
  for each node, determining, by the processor, the weight of evidence of said each node by:
    dividing the plurality of production paths into a group of production paths containing said each node and a group of production paths not containing said each node;
    calculating a weight of evidence of said each node in each group according to:

$$WOE_i = \ln\left(\frac{\frac{G_i}{G_{total}}}{\frac{B_i}{B_{total}}}\right) \quad i = 1 \text{ or } 2,$$

wherein $WOE_i$ represents a weight of evidence of a corresponding node in a group of production paths containing the corresponding node and a group of production paths not containing the corresponding node, $\ln(\cap)$ represents a natural logarithmic function, $G_i$ represents a number of faulty production batches of a corresponding group of production paths group of production paths, $G_{total}$ represents a total number of faulty production batches, $B_i$ represents a number of faultless production batches of the corresponding group of production paths, and $B_{total}$ represents a total number of faultless production batches.

12. The method of claim 1, further comprising:
calculating, by the processor, a weight of evidence of each node based on whether the plurality of production paths are faultless in the one or more production batches;
calculating, by the processor, an information value of said each node based on the weight of evidence according to:

$$IV = \sum_i IV_i, \text{ and}$$

$$IV_i = \left(\frac{G_i}{G_{total}} - \frac{B_i}{B_{total}}\right) \times WOE_i,$$

wherein IV represents the information value of said each node, and $IV_i$ is an information value of said each node in a corresponding group; and determining, by the processor, a third number of nodes having information values ranked in front to be faulty nodes.

13. A device of detecting fault in production, comprising:

a processor; and a memory, having instructions stored thereon, wherein the instructions, when executed by the processor, cause the processor to implement the method of claim 1.

14. A computer-readable storage medium storing instructions that, when executed by a processor, cause the processor to implement the method of claim 1.

* * * * *